Dec. 1, 1970  B. C. CRANAGE  3,544,257
COUPLER ASSEMBLY
Filed Feb. 5, 1969  2 Sheets-Sheet 1

INVENTOR
BIDWELL C. CRANAGE
BY
Cohn and Powell
ATTORNEYS

Dec. 1, 1970     B. C. CRANAGE     3,544,257
COUPLER ASSEMBLY

Filed Feb. 5, 1969     2 Sheets-Sheet 2

INVENTOR
BIDWELL C. CRANAGE
BY
Cohn and Powell
ATTORNEYS

United States Patent Office 3,544,257
Patented Dec. 1, 1970

3,544,257
COUPLER ASSEMBLY
Bidwell C. Cranage, Ferguson, Mo. (% Stile-Craft Manufactures Inc., 1801 Lilly Ave., St. Louis, Mo. 63110)
Continuation-in-part of application Ser. No. 556,173, June 8, 1966. This application Feb. 5, 1969, Ser. No. 796,866
The portion of the term of the patent subsequent to June 10, 1986, has been disclaimed
Int. Cl. F16l 5/02
U.S. Cl. 137—360                                    9 Claims

ABSTRACT OF THE DISCLOSURE

The coupler assembly includes a station for a designated fluid, the station comprising an adjustable two-part valve attached to a fluid supply. A cover plate is provided having a bracket attached to one side of the cover plate. The cover plate bracket includes a pair of projecting keys located at specific points to correspond with the particular fluid designation of the cover plate. A coacting slot is provided on each part of the valve at specific points corresponding to the fluid designation of the station slots to permit assembly of the coupler when a condition of matching fluid designation exists between the various parts.

CROSS-REFERENCE TO RELATED APPLICATION

This application is a continuation-in-part of the copending application, Ser. No. 556,173 filed June 8, 1966, now Pat. 3,448,760, entitled, "A Coupler Assembly."

BACKGROUND OF THE INVENTION

This invention relates to a coupler assembly, and in particular, to a coupler which includes keying means precluding the inadvertent miscoupling of connected parts.

Standardization of mechanical parts and fittings is universally desirable in the coupling assemblies of the type under discussion for obvious reasons which include economy of manufacture and convenience of replacement to the ultimate consumer. There are situations, however, when such standardization is fraught with danger.

When several fluid lines exist in the same environment, using substantially interchangeable parts, yet conveying different fluids, there is a distinct possibility that miscoupling might be made which, in some circumstances, could be fatal. The danger is clear, for example, in a hospital environment where the various fluid lines carrying gases such as oxygen and air, may frequently be placed side-by-side with vacuum or nitrogen lines.

A designated fluid station which is wall-mounted usually includes a two-part valve; a supply line to the valve; a hose plug adapted to suit the valve; a hose transferring fluid from the valve and a wall cover plate. Several misconnection possibilities exist. For example, the two parts of the valve might be misconnected; the wrong hose plug might be inserted in the valve, or the wrongly designated cover plate might be placed at the station.

This possibility of error, unless some identifying medium is interposed between connected parts, is great and could result in a hospital patient, for instance, being fed air instead of vital oxygen.

SUMMARY OF THE INVENTION

This coupler assembly provides a means of obviating the danger of miscoupling various fluid lines without significantly reducing the importance and standardization of coupled parts.

The provision of interfitting keys and slots in the present device renders impossible the miscouplings of parts and ensures in addition, that the identifying cover plate will be compatible with the supply line to the valve.

The coupler assembly includes a station for a designated fluid comprising a valve plug-receiving means having a distal end adapted to receive a supply of a designated fluid. The assembly includes bracket means extending transversely of the valve plug-receiving means and disposed in fixed relation from the distal end, said transverse bracket including a key or slot. A cover plate is provided, having a fluid designation conforming to that of the station, the key or slot being predeterminately located to correspond with the fluid designation of the cover plate and interfitting respectively the coacting key or slot located in the predetermined position on the transverse bracket.

In the preferred embodiment, the cover plate includes a bracket secured on one side and providing the key. The transverse bracket is provided with the key slot. The valve plug-receiving means includes a base portion and a forward head portion detachably carried by the base portion, the head portion being threadedly adjustable longitudinally within the base portion. The base portion carries the transverse bracket having the slot and the forward head portion also includes a slot.

The cover plate key means (the key means including a key) includes a pair of lugs located in a predetermined position depending on the fluid designation of the cover plate and interfitting respectively the coacting slots located in the predetermined positions on the transverse bracket and the head portion.

The bracket includes spaced flanges extending from the cover plate and the adjustable head portion is located between said bracket flanges to align the plug-receiving means with the cover plate means when the coacting keys of a compatible bracket interfit the coacting slots of a compatible head portion and base portion for a particularly designated fluid. The threadedly adjustable head portion is operatively held in nonrotatable relation with the cover plate in the operative position.

DESCRIPTION OF THE PREFERRED EMBODIMENT

Figure 1:
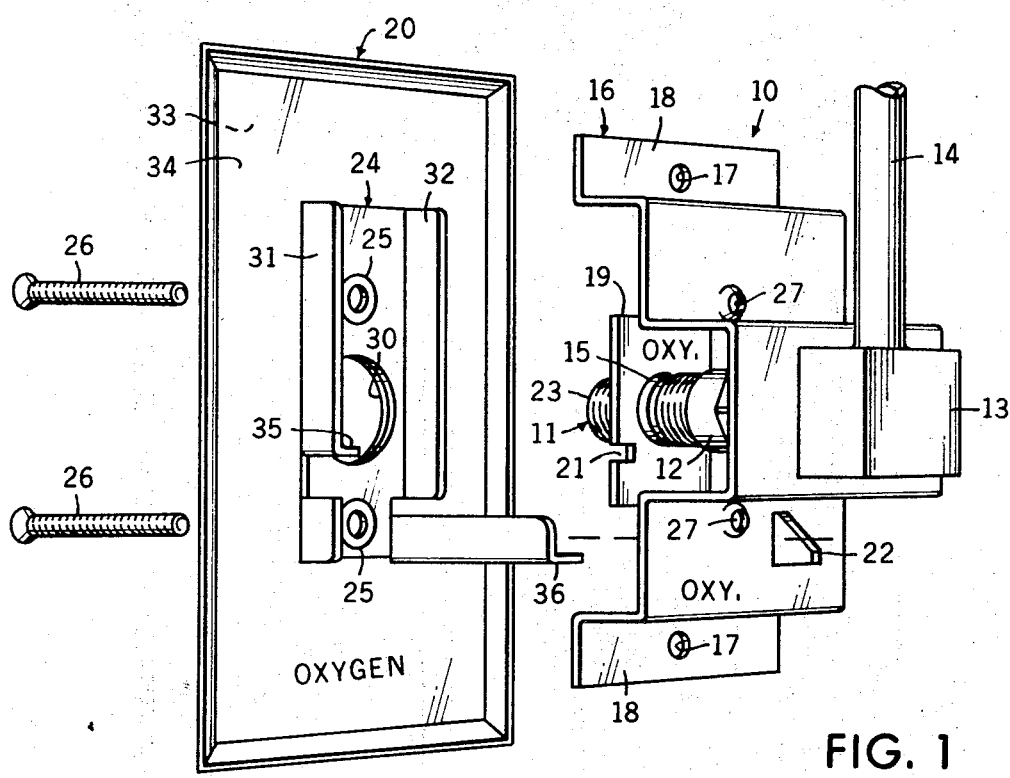
FIG. 1 is an exploded view in perspective of a matched, three-part coupler assembly.

Referring now by characters of reference to the drawings, and first to FIG. 1, it will be understood that the coupler assembly includes a station generally indicated by numeral 10, the station being provided for a designated fluid such as oxygen. A hose, not shown, may be hooked up to the station 10 and thereby supply one or more facilities with the designated fluid. To this end, the station 10 includes a valve plug-receiving means 11. The valve plug-receiving means 11 includes a base portion 12, having a rear portion 13 interconnected to a supply pipe 14, and a forward head portion 15 detachably carried by the base portion 12. The forward head portion 15 is threadedly received by the base portion 12 in adjustable relation thereto. A stepped, transverse bracket 16 is attached to the rear portion 13 of the base portion 12. This bracket 16 is thereby disposed in fixed spaced relation from the distal end of the plug-receiving means 11.

The station 10 is intended to be wall mounted in the present embodiment, and to facilitate such mounting, the transverse bracket 16 is formed into a stepped configuration. Wall mounting apertures 17 are provided at the upper and lower ends of the bracket 16. The wall to which the station is mounted is omitted for clarity. However, it will be understood that the stepped portions 18 are intended to be substantially flush with the wall and that the apertures 17, disposed on said stepped portions 18, are provided to facilitate such mounting. The station 10 is concealed in its wall-mounted position by means of a cover plate 20 which has the fluid identification embossed or otherwise imprinted thereon.

The forward head portion 15 includes an integral flange 19. The flange 19 and the transverse bracket 16 each include a slot indicated by numerals 21 and 22 respectively. Each slot 21 and 22 forms part of an interfitting key and slot means between the station 10 and the cover plate 20. The slots 21 and 22 are located in a predetermined position on the flange 19 and the bracket 16, the location being related to particular designated fluids.

The cover plate 20 serves the usual function of a wall plate, in that it provides a fascia concealing the station 10. In addition to this function, however, the cover plate 20 provides coacting key means forming part of the interfitting key and slot means, already referred to above, which assures that a cover plate with the correct cover plate designation is applied to the station for that particular designated fluid. To facilitate this function, the cover plate 20 includes a bracket 24 which is secured to the cover plate 20 by a pair of hollow rivet portions 25. The rivets 25, in addition to securing the bracket 24 to the cover plate 20, provide a convenient means by which the cover plate 20 is attached to the station 10, in that the hollow rivets 25 form clearance apertures for a pair of fasteners 26. The fasteners 26 are threadedly receivable within a pair of apertures 27 formed in the transverse bracket 16.

The threaded apertures 27 are, of course, disposed in registerable relation with the hollow rivets 25 so as to align the cover plate 20 with the station 10 when the cover plate 20 is operatively attached to the station 10. When the cover plate 20 is in correct alignment, a socketed forward end 23 of the forward head portion 15 is aligned and receivable within an aperture 30 provided in the cover plate 20. In this way, the socketed forward end 23 is accessible from the other side of the cover plate 20 and connectible to a fluid-transferring plug (not shown) at the end of the hose referred to above.

The cover plate bracket 24 includes a pair of opposed side flanges 31 and 32. The side flanges 31 and 32 are so spaced as to accommodate the outstanding flange 19 of the forward head portion 15 in clearance rotation. Thus accommodated, the forward head portion 15 is precluded from rotation, and the threaded longitudinal adjustment thereof, relative to the station 10, is selectively maintained.

The advantage of this holding function provided by the side flanges 31 and 32 is that the forward head portion 15 may be threadedly adjusted to the most desirable position to suit the connection of parts. This position is normally such as to assure that the socketed forward end 23 of the head portion 15 is in substantially flush relation with the exposed face 33 of the cover plate 20, when the stepped bracket portions 18 bear on the rear of the cover plate 20 above and below the bracket 24. The transverse bracket 16 cooperates with the cover plate 20 to provide a housing for the plug-receiving means 11.

The cover plate bracket 24 includes a pair of bent portions formed into integral lugs, providing keys 35 and 36 which are disposed in predetermined locations corresponding to a particular fluid designation. In the illustrated embodiment of FIG. 1, the key 35 projects transversely from the flange 31 so as to interfit the compatible, matched slot 21 of the forward head flange 19 when the flange 19 is oriented as shown. It will be understood that the threading of the forward head portion 15 is fine rather than coarse to permit rotation of the head portion 15 accompanied by only a slight longitudinal movement of the head portion 15 relative to the base portion 12. Because of this arrangement, the half-turn of the forward head portion 15, which may be required to attain the correct rotational alignment of the slot 21 to suit the disposition of the key 35 will not appreciably affect the received relation of the socketed forward end 23 within the cover plate aperture 30.

Figure 2:
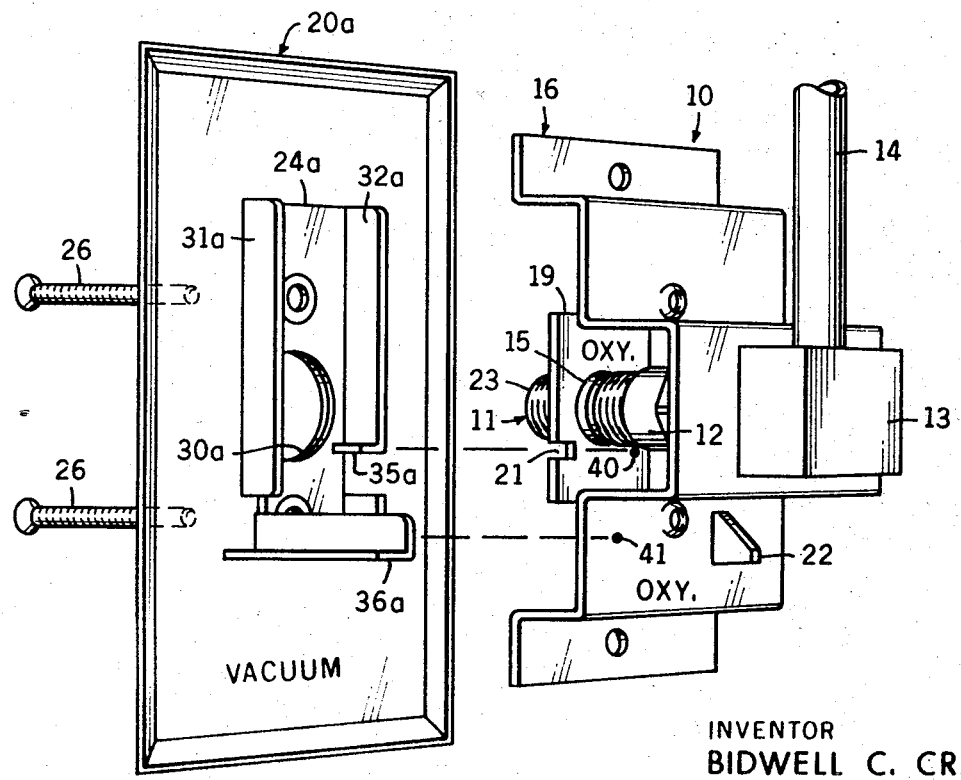
FIG. 2 is a similar view of a coupler assembly in which the wall cover plate is mismatched.
Figure 3:
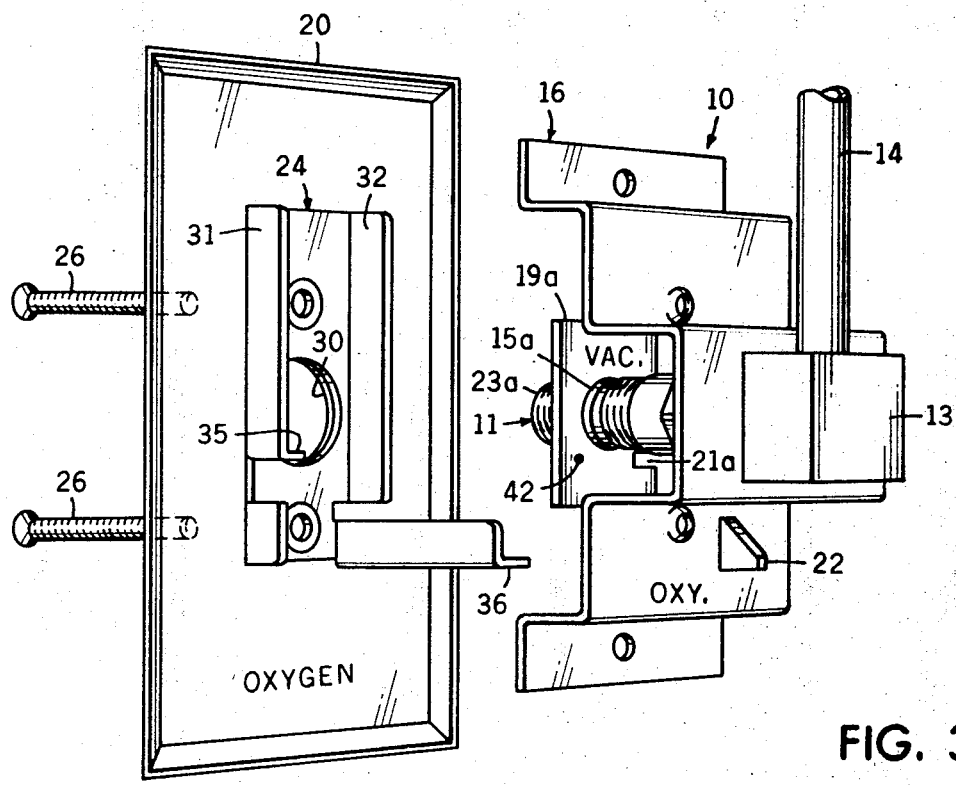
FIG. 3 is a similar view in which the forward portion of the valve is mismatched.

As clearly illustrated in FIG. 1, the key 36 projects transversely of the cover plate 24 sufficiently to interfit the compatible matched slot 22 of the transverse bracket 16. The key 36 is preferably of an angular cross section configuration because this shape permits greater versatility in the matching of the key 36 to a compatible triangular slot, such as slot 22, than would be possible with a key having a rectangular configuration. This advantage will become obvious on a consideration of the mismatched keys which are illustrated in FIGS. 2 and 3 respectively and discussed below in some detail. Further, by providing the key 36 with an angular configuration, the key 36 is much stronger structurally and is in no danger of being bent on account of its relatively long cantilevered length.

It is thought that the functional advantages of this coupling assembly have become fully apparent from the foregoing description of parts but for completeness of disclosure, the installation of the device will be briefly described.

Figure 4:
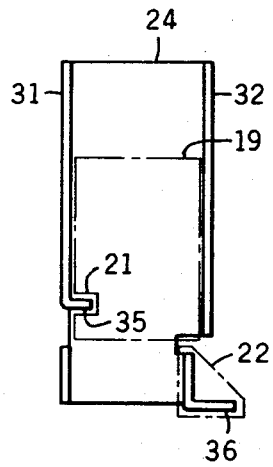
FIGS. 4, 5 and 6 are elevational views of superimposed matched and mismatched assembly parts corresponding to FIGS. 1, 2 and 3, respectively.
Figure 5:
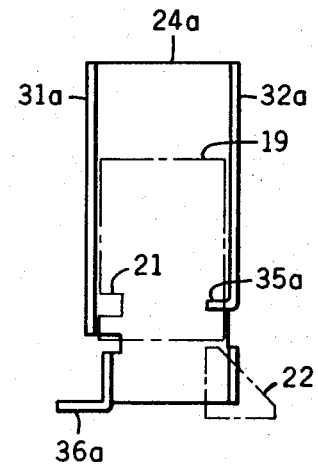
Figure 6:
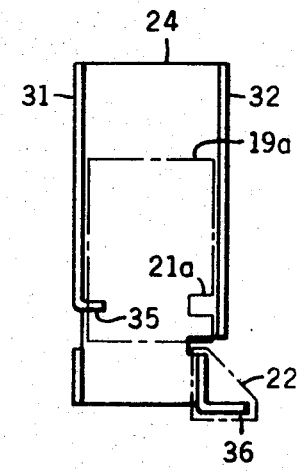

FIGS. 1 and 4 illustrate clearly the disposition of keys and slots in a compatible assembly, for example, one which is provided to service an oxygen station. FIGS. 2 and 3, together with FIGS. 5 and 6, illustrate the disposition of keys and slots in a mismatched assembly.

For the purposes of example, it will be supposed that an oxygen station 10 has been installed in place in each of the assemblies illustrated in FIGS. 1, 2 and 3. In the discussion, like parts in the assemblies illustrated in FIGS. 1, 2 and 3 are denoted by the same number for convenience. Where the part is similar but not identical, a suffix $a$ is used to distinguish that part.

In FIG. 1, a compatible forward head portion 15 and a compatible cover plate 20 are illustrated which correspond to the fluid designation of oxygen. In this case, the keys 35 and 36 on the cover plate 20 are in predetermined positions corresponding to the slots 21 and 22 in the forward head flange 19 and the transverse bracket 16 respectively. There is, therefore, a perfect match and the assembly may be connected together by threadedly adjusting the longitudinal disposition of the forward head portion 15 within the base portion 12, and then fastening the cover plate 20 to the transverse bracket apertures 27 by means of fasteners 26. FIG. 4 illustrates the superimposed relation of connected parts.

Referring now to FIG. 2, it will be observed that although a forward compatible head portion 15 is adjustably received by the base portion 12, a mismatched cover plate 20$a$ having a bracket 24$a$ and keys 35$a$ and 36$a$ attached, is presented for connection to the station 10. It can be readily seen that the incompatible cover plate 20a cannot be connected to station 10 for the reason that the key 35a is on the wrong side to be received by the slot 21. Further, because the key 35a and the slot 21 are selectively offset from the axis of the value plug-receiving means 11, a half turn of the forward head portion 15 will not render the key 35a and the slot 21 any more compatible than they are as shown in FIG. 2.

The key 36a is likewise on the wrong side to be received by the slot 22 and it will be observed that the eccentric disposition of the key 36a and the slot 21 relative to the axis of the valve plug-receiving means 11 precludes acceptance of the key 36a in the slot 22. This is so even though the cover plate 20 were to be rotated through 180°. The points 40 and 41 on the flange 19 and the bracket 16 indicate clearly, in projected relation, the incompatible positioning of the keys 35a and 36a with respect to the slots 21 and 22. The superimposed relation of the mismatched parts is clearly shown in FIG. 5.

FIG. 3 illustrates another mismatched assembly. In this case,, the cover plate 20 and the corresponding parts are compatible with the transverse bracket 16 of the station 10. However, an incompatible forward head portion 15a, having a flange 19a has been threadedly attached to the base portion 12. Even though only one of the assembled parts, namely the forward head portion 15a, is mismatched, complete assembly of the device is impossible. The key 36, although correctly aligned with the slot 22, cannot be fully received therewithin because there is no compatible slot to accept the key 35. The incompatible flange 19a provides a stop means, as indicated by the projection point 42, precluding proper connection of the coupler assembly parts. Moreover, rotation of the forward head portion 15 will not orient the slot 21 to a position of acceptance by the key 35 because of the offset relationship of the key and slot to the longitudinal axis of the valve. The superimposed relation of parts is clearly disclosed in FIG. 6.

Of course, the successful practice of the invention is not limited to disposing a key of a matched assembly part on the opposite side to a similar key for a mismatched assembly part. On the contrary, the invention is such that there is virtually no limit to the number of mismatches that can be accommodated. By disposing incompatible keys in locations only slightly spaced from the compatible key relation, incompatibility of the assembly is assured.

For example, the keys for hydrogen, nitrogen and air, corresponding to key 35 for oxygen, need be disposed only a short distance vertically on their respective cover plate brackets from the location of key 35 on the cover plate designated oxygen to preclude acceptance into a slot 21. The nonacceptance of an incompatible key is assured when, as in the preferred embodiment, it is a necessary condition for successful assembly that two keys be fitted into compatible relation and not merely one. It is a further advantage that the angularity of the second key is such that very slight change in location of the key is necessary to produce an incompatibility of parts. In fact, mere rotation of the key corresponding to one fluid designation is sufficient to assure incompatibility of a key corresponding to another fluid designation.

It is a feature of this device that if, inadvertently, a cover plate is inscribed with one fluid designation and yet has an attached cover plate bracket for another fluid, the cover plate will not be compatible with a station bearing the cover plate designation until the cover plate bracket is also made incompatible.

I claim as my invention:

1. In a coupler assembly,
    (a) a station for a designated fluid comprising a valve plug-receiving means having a distal end adapted to receive a supply of said designated fluid,
    (b) bracket means extending transversely of the valve plug-receiving means and disposed in fixed relation longitudinally of the valve plug-receiving means relative to the distal end, said transverse bracket means including a key or slot located at a predetermined position depending on the fluid designation, and
    (c) a cover plate for the station, the cover plate including an opening aligned with the valve plug-receiving means, the cover plate having a fluid designation conforming to that of the station and having a key or slot located in a predetermined position depending on the fluid designation of the station and interfitting respectively with the coacting slot or key located in the predetermined position on the transverse bracket means, the predetermined position of the coacting key and slot being different for different fluids.
2. A coupler assembly as defined in claim 1, in which:
    (d) the cover plate includes a bracket secured on one side of the cover plate, said cover plate bracket providing the key or slot that coacts with the slot or key on the transverse bracket means.
3. A coupler assembly as defined in claim 2, in which:
    (e) the transverse bracket means is provided with the key slot and the cover plate bracket includes the interfitting key matching said key slot when the cover plate with the correct fluid designation is applied to the station for that designated fluid.
4. A coupler assembly as defined in claim 3, in which:
    (f) the cover plate bracket includes an integrally formed, elongate lug projecting substantially laterally of said cover plate and providing said interfitting key.
5. In a coupler assembly:
    (a) a station for a designated fluid comprising a valve plug-receiving means having a base portion and a forward head portion detachably carried by the base portion,
    (b) a cover plate for the station having an opening having a fluid designation conforming to that of the station, and
    (c) key or slot means located in a predetermined position on the cover plate depending on the fluid designation of the cover plate, the key or slot means including:
        (1) a key or slot interfitting respectively a coacting slot or key located in a predetermined position on the head portion,
        (2) a key or slot interfitting respectively a coacting slot or key located in a predetermined position on the base portion,
        (3) the predetermined positions of the coacting keys and slots being different for each fluid, and
        (4) the interfitted keys and slots assuring that the cover plate having the correct fluid designation will be mounted to the station for that designated fluid.
6. A coupler assembly as defined in claim 5, in which:
    (d) the cover plate includes a bracket secured to one side thereof, said bracket providing the keys or slots, and
    (e) the head portion is threadedly adjustable longitudinally within the base portion.
7. A coupler assembly as defined in claim 6, in which:
    (f) the bracket includes spaced flanges extending from the cover plate, and
    (g) the adjustable head portion is located between the cover plate bracket flanges to align the plug-receiving means with the cover plate opening when the coacting key and slot of a compatible bracket and head portion and the coacting key and slot of a compatible bracket and the base portion, for a particular designated fluid, are interfitted.
8. A coupler assembly as defined in claim 6, in which:
    (f) the cover plate bracket includes a pair of integral lugs providing the interfitting keys, and
    (g) the head portion and base portion each includes a slot providing the interfitting slots.

9. A coupler assembly as defined in claim 8, in which:
(h) the base portion includes a transverse bracket having said base portion slot located therein.

References Cited

UNITED STATES PATENTS

| | | | |
|---|---|---|---|
| 1,425,049 | 8/1922 | Peterson | 339—186 |
| 3,108,825 | 10/1963 | MacDonald | 285—18 |
| 3,170,667 | 2/1965 | Szohatzky | 251—149.6 |
| 3,194,588 | 7/1965 | Buckey et al. | 285—18 |
| 2,908,511 | 10/1959 | Rogers | 137—359XR |

FOREIGN PATENTS 771,968   4/1957   Great Britain.

HENRY T. KLINKSIEK, Primary Examiner

U.S. Cl. X.R.

251—149.6

Disclaimer 3,544,257.—*Bidwell C. Cranage*, Ferguson, Mo. COUPLER ASSEMBLY.
　　Patent dated Dec. 1, 1970. Disclaimer filed Nov. 1, 1976, by the assignee, *Chemtron Corporation*.
　Hereby enters this disclaimer to claims 1, 2, 3 and 4 of said patent.
　　[*Official Gazette December 14, 1976.*]